United States Patent Office 3,267,133
Patented August 16, 1966

3,267,133
PROCESS FOR PREPARING 2,2-DIMETHYLALKYL ACRYLATES AND METHACRYLATES
Hugh J. Hagemeyer, Jr., and Milton A. Perry, Longview, Tex., assignors to Eastman Kodak Company, Rochester, N.Y., a corporation of New Jersey
No Drawing. Filed Nov. 6, 1964, Ser. No. 409,557
6 Claims. (Cl. 260—486)

This is a continuation-in-part of application Serial No. 179,246, filed March 12, 1962, now abandoned.

This invention relates to 2,2-dimethylalkyl esters of acrylic and methacrylic acids represented by the general formula:

I.

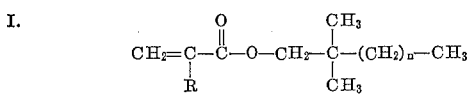

wherein $n$ represents a whole number from 0 to 3 and R represents hydrogen or methyl group, and more particularly this invention relates to a process for their preparation.

It is known that alkyl esters of β-alkoxy substituted carboxylic acids can be pyrolyzed in the vapor phase, in the presence of inorganic bases, to give the corresponding unsaturated acid esters. For examples, W. F. Gresham, U.S. Patent No. 2,457,225, dated December 28, 1948, shows the conversion of methyl β-methoxypropionate to methyl acrylate, of ethyl β-ethoxypropionate to ethyl acrylate, etc., in the presence of organic bases. However, it has been found that this procedure of producing the acrylate is commercially practicable only with the simplest ester, namely methyl ester. Use of higher alkyl esters of β-alkoxypropionic acid do not give the respective higher alkyl acrylate in a desirable reaction medium. The higher alkyl acrylate is formed along with such other reaction products as an alcohol, olefin and highly objectionable free acrylic acid. This result is also true in the case of the corresponding higher alkyl esters of β-alkoxyisobutyric acid where the product obtained is a mixture of alcohol, olefin and in this case free methacrylic acid. Accordingly it would be expected from this teaching that the pyrolysis of any alkyl esters of β-alkoxypropionic acid and β-alkoxyisobutyric acid would also be inoperative for producing the higher corresponding higher acrylates and methacrylates free of the corresponding acrylic acids.

We have now made the surprising discovery that 2,2-dimethylalkyl esters of β-alkoxypropionic and β-alkoxyisobutyric acids can be thermally cracked (pyrolyzed) in a smooth and efficient manner to give the defined monomeric 2,2-dimethylalkyl acrylates and methacrylates of the invention and that these products are essentially free from contaminating acids thereby eliminating extra trouble and cost of purification. We have further found that the monomeric esters of our invention are useful not only as chemical intermediates for preparing, for example, acids and alcohols by hydrolysis, but more particularly as starting materials for preparing resinous high molecular polymers that show improved crystallinity and vastly improved thermal and hydrolytic stability.

It is accordingly an object of the invention to provide novel monomeric 2,2-dimethyl acrylates and methacrylates. Another object is to provide a process for preparing these monomers. Another object is to provide a process for preparation wherein costly separation steps will not be necessary to separate the monomer from residual products such as catalysts and free acrylic acid. Other objects will become apparent hereinafter.

In accordance with our invention, we prepare the compounds represented by the above Formula I by subjecting the appropriate 2,2-dimethylalkyl ester of β-alkoxypropionic acid or β-alkoxyisobutyric acid to thermal cracking in the vapor phase, at from about 450 to 550° C., condensing the gases evolved and separating the condensed product consisting essentially of a mixture of the desired ester and by-product alcohol by conventional purification and separation means such as evaporation, extraction, etc., but more especially by distillation processes. A yield in excess of 50 percent of theoretical complete conversion to the acrylate or methacrylate product is obtained. If desired, the starting saturated ester may be vaporized and diluted with an inert gas such as nitrogen and the mixture then subjected to the thermal cracking process. Pressures above or below atmospheric can be employed but preferably the cracking procedure is carried out at or near normal atmospheric pressures. Advantageously, the process may be carried out in continuous or semi-continuous manner. The reaction scheme is as follows:

II.

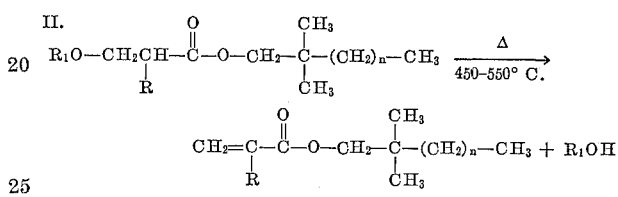

wherein R is as above defined and $R_1$ represents a lower alkyl group of from 1 to 4 carbon atoms, e.g., methyl, ethyl, propyl, isopropyl, butyl, etc., groups. The starting intermediate 2,2-dimethylalkyl β-alkoxypropionic and β-alkoxyisobutyric acid esters are prepared by estrifying the corresponding free acids with the appropriate 2,2-dimethylalkanols in the presence of an esterification catalyst such as p-toluene sulfonic acid and separating the resulting esters by conventional means. Suitable intermediate 2,2-dimethylalkanols are represented by the structural formula:

III.

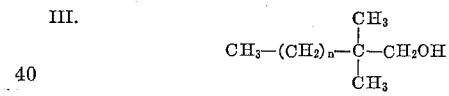

wherein $n$ is as previously defined. Typical alkanols of this kind include 2,2-dimethylpropanol, 2,2-dimethylbutanol, 2,2-dimethylhexanol, etc. These alkanols may be prepared by hydrogenation of the corresponding 2,2-dimethylalkanoates by contact with a suitable catalyst such as barium copper chromite at about 250° C. and a pressure of from about 3,000 to 6,000 p.s.i. For further details of this process, reference may be had to copending application of Alden E. Blood and Hugh J. Hagemeyer, Jr., Serial No. 144,634, filed October 12, 1961, wherein is described the preparation of the above-mentioned 2,2-dimethylalkanols.

The process of the invention is particularly useful as the last step in the process of converting acrolein and methacrolein to higher alkyl esters of acrylic and methacrylic acids, in this case to the esters of the invention, namely, the defined 2,2-dimethylalkyl esters of these acids. Briefly, the overall process comprises (1) reacting acrolein or methacrolein with a lower aliphatic alcohol such as methanol in the presence of a suitable esterification catalyst such as substituted amine salts of organic acids, bases, etc., to give the corresponding β-alkoxypropionaldehyde or β-alkoxyisobutyraldehyde, (2) subjecting these compounds to air oxidation to give the corresponding free acid β-alkoxypropionic and β-alkoxyisobutyric acids, (3) esterifying the said free acids with a suitable 2,2-dimethylalkylalkanol to give the corresponding esters, and (4) thermally cracking the esters of above (3) to give the corresponding 2,2-dimethylalkyl esters of acrylic and methacrylic acids directly.

The following examples will serve to further illustrate the manner of practicing our invention. Examples 1–5 are exemplary of the process of preparing the β-alkoxy acids which are reacted as shown in Examples 6–8 to form the respective acrylic ester. This ester is subsequently subjected to pyrolysis as shown in Example 9.

EXAMPLE 1

*Preparation of β-methoxypropionaldehyde*

In a one-liter, three-necked flask was placed 280 grams (8.75 moles) of methanol. The flask was equipped with a stirrer, addition funnel and reflux condenser. The apparatus was arranged to provide a nitrogen blanket in the entire unit. To the stirred methanol was added 0.4 gr. of sodium and after the solution was complete the mixture was cooled to −6° C. Over a period of 2.5 hours, 140 grams (2.5 moles) of acrolein was added dropwise maintaining a temperature of −10 to 0° C. After addition was complete the product was stirred for 2 hours and then brought to a pH of 6 with glacial acetic acid. Distillation of the products under reduced pressure gave 140 grams of β-methoxypropionaldehyde, conversion 63.6 percent.

EXAMPLE 2

Operating as in Example 1 but using methacrolein, a 50 percent conversion to β-methoxyisobutyraldehyde, B.P. 124 to 125° C., was obtained.

EXAMPLE 3

Repetition of Example 1 using 5 percent trimethylammonium formate rather than sodium as the catalyst gave a 92 percent conversion to β-methoxypropionaldehyde. Repetition of Example 2 using 5 percent trimethylammonium formate gave an 84 percent conversion to β-methoxyisobutyraldehyde.

EXAMPLE 4

*Preparation of β-methoxypropionic acid*

β-Methoxypropionaldehyde prepared as in Example 1 was blown with air at 30 to 35° C. using a cobalt stearate catalyst. The reaction was carried out in benzene. The reaction mixture on fractionation gave β-methoxypropionic acid, B.P. 89° C. at 9 mm. in 87 percent conversion.

EXAMPLE 5

In a reaction identical to that described in Example 4, except that β-methoxyisobutyraldehyde was substituted for β-methoxypropionaldehyde, an 80 percent conversion to β-methoxyisobutyric acid, B.P. 72° at 1 mm. was obtained.

EXAMPLE 6

*Esterification of β-methoxypropionic acid*

One mole (104 grams) of β-methoxypropionic acid, 3 moles of methanol, 30 ml. of dichloroethane and 6 grams of p-toluene sulfonic acid was refluxed for 23 hours. After cooling the mixture was washed with water and then with 5 percent sodium bicarbonate. After washing again until neutral, the solution was dried and distilled to give 71 percent conversion to methyl β-methoxypropionate, B.P. 55° at 21 mm.

EXAMPLE 7

In a similar fashion to Example 6, methyl β-methoxyisobutyrate was prepared in 62 percent conversion by the esterification of β-methoxyisobutyric acid. The product boiled at 144 to 147° C.

EXAMPLE 8

By simple esterification procedures in which the β-alkoxy acid was reacted with the appropriate alcohol coming within the above Formula III, in the presence of sulfuric acid as the catalyst and using benzene as a water entraining agent, a number of the esters of the invention were prepared. The yields and boiling points are listed for these esters together with other prepared esters included for comparison purposes in the following table.

TABLE I

| Ester | Yield, Percent | B.P., ° C. |
|---|---|---|
| Ethyl β-methoxypropionate | 86 | 72° at 39 mm. |
| Isobutyl β-methoxypropionate | 91 | 110° at 40 mm. |
| n-Amyl β-methoxypropionate | 93 | 110° at 10 mm. |
| n-Hexyl β-methoxypropionate | 94 | 122° at 11 mm. |
| n-Octyl β-methoxypropionate | 95 | 145° at 12 mm. |
| Methyl β-methoxyisobutyrate | 62 | 144–147° |
| Ethyl β-methoxyisobutyrate | 88 | 77° at 41 mm. |
| Isobutyl β-methoxyisobutyrate | 79 | 108° at 20 mm. |
| n-Amyl β-methoxyisobutyrate | 95 | 127° at 18 mm. |
| n-Hexyl β-methoxyisobutyrate | 95 | 135° at 16 mm. |
| n-Octyl β-methoxyisobutyrate | 93 | 158° at 8 mm. |
| 2,2-dimethylbutyl β-methoxypropionate | 88 | 125° at 18 mm. |
| 2,2-dimethylhexyl β-methoxypropionate | 84 | 145° at 18 mm. |
| 2,2-dimethylpropyl β-methoxypropionate | 93 | 122° at 38 mm. |
| 2,2-dimethylbutyl β-methoxyisobutyrate | 74 | 109° at 7 mm. |
| 2,2-dimethylpropyl β-methoxyisobutyrate | 78 | 130° at 40 mm. |
| 2,2-dimethylhexyl β-methoxyisobutyrate | 68 | 140° at 4 mm. |

EXAMPLE 9

*Pyrolysis of alkyl esters of Examples 6, 7 and 8*

The esters described in Examples 6, 7 and 8 were thermally cracked over Pyrex chips in a vertical tube heated with an electric furnace. The mode of operation was essentially identical for the individual esters with only temperature of cracking and residence time in the reactor being varied with the individual esters. Thus the individual esters were fed through a metering pump into the top of a vertically arranged steel pipe 1 in. I.D. by 28 in. long. The top one-third of the reactor served as a preheater. The effluent products were condensed and distilled. Noncondensable gases were analyzed by gas chromatography and identified by peak elution times as well as by conventional chemical analysis. The results of these analysis on reaction products produced according to the example are reported in the following tables. Table II shows the results obtained when using the conventional alkyl esters of β-alkoxy substituted carboxylic acids. Table III shows the results obtained when using the 2,2-dimethyl substituted alkyl esters. (Unreacted starting material is not listed as a product.)

TABLE II.—PYROLYSIS OF ORDINARY ESTERS OF β-METHYOXYPROPIONIC AND β-METHOXYISOBUTYRIC ACIDS

| Esters (Percent Conversion) | Cracking Temp.,° C. | Time, Sec. | Products [2] (percent of total product) |
|---|---|---|---|
| Ethyl β-methoxypropionate (65) | 480–500 | 4 | Acrylic acid (52),[1] Methanol (23), Ethylene (21). |
| Isobutyl β-methoxypropionate (77) | 450–475 | 4 | Acrylic acid (46),[1] Methanol (19), Isobutylene (34). |
| n-Amyl β-methoxypropionate (73) | 500–525 | 6 | Acrylic acid (41),[1] Methanol (16), Pentene (40). |
| n-Hexyl β-methoxypropionate (73) | 510–540 | 6 | Acrylic acid (37),[1] Methanol (18), Hexene (44). |
| n-Octyl β-methoxypropionate (70) | 500–520 | 6 | Acrylic acid (36),[1] Methanol (16), Octene (49). |
| Ethyl β-methoxyisobutyrate (72) | 480–500 | 4 | Methacrylic acid (56),[1] Methanol (22), Ethylene (18). |
| Isobutyl β-methoxyisobutyrate (80) | 450–475 | 4 | Methacrylic acid (49),[1] Methanol (18), Isobutylene (32). |
| n-Amyl β-methoxyisobutyrate (75) | 510–525 | 6 | Methacrylic acid (46),[1] Methanol (17), Pentene (37). |
| n-Hexyl β-methoxyisobutyrate (71) | 500–525 | 6 | Methacrylic acid (41),[1] Methanol (16), Hexene (42). |
| n-Octyl β-methoxyisobutyrate (72) | 515–535 | 6 | Methacrylic acid (39),[1] Methanol (15), Octene (45). |

[1] The acrylic acid and methacrylic acid formed are undesirable products in a process for production of alkyl acrylates.
[2] Not listed with the products obtained are plugs and deposits in the reactor which occurred in every case with ethyl, isobutyl n-Amyl, n-Hexyl and n-Octyl. Also not listed are β-methoxypropionate and β-methoxyisobutyrate starting materials and some polymeric material in the residue not completely identified.

TABLE III

| Esters (Percent Conversion) | Cracking Temp., °C. | Time, Sec. | Products [1] (percent of total product) |
|---|---|---|---|
| 2,2-dimethylpropyl β-methoxypropionate (61) | 510–535 | 6 | 2,2-dimethylpropl acrylate (82), Methanol (18). |
| 2,2-dimethylbutyl β-methoxypropionate (59) | 510–525 | 6 | 2,2-dimethylbutyl acrylate (82), Methanol (17). |
| 2,2-dimethylhexyl β-methoxypripionate (57) | 510–525 | 6 | 2,2-dimethylhexyl acrylate (84), Methanol (15). |
| 2,2-dimethylpropyl β-methoxyisobutyrate (58) | 500–510 | 6 | 2,2-dimethylpropyl methacrylate (83), Methanol (16). |
| 2,2-dimethylbutyl β-methoxyisobutyrate (62) | 510–525 | 6 | 2,2-dimethylbutyl methacrylate (85), Methanol (16). |
| 2,2-dimethylhexyl β-methoxyisobutyrate (60) | 510–525 | 6 | 2,2-dimethylhexyl methacrylate (85), Methanol (14). |

[1] The product in this series of reactions was remarkably free of polymeric materials.

It can be readily seen from Table II that the ordinary esters of two carbons or more such as the ethyl, isobutyl, n-amyl, n-hexyl and n-octyl esters of β-methoxypropionic and β-methoxyisobutyric acids on thermal cracking do not give the corresponding acrylates and methacrylates. They give the free acrylic and methacrylic acids together with split off alcohol and hydrocarbons. In contrast to this result, it will also be seen from above Table II that the corresponding 2,2-dimethylalkyl β-methoxypropionates and β-methoxyisobutyrates of the invention on thermal cracking under essentially the same conditions result unexpectedly in the desired corresponding 2,2-dimethylalkyl acrylates and methacrylates without measurable amounts of hydrocarbon decomposition products. Thus, the respective acrylate can be easily purified to give a resultant product free from acrylic or methacrylic acid. These valuable monomers give polymers of high crystallinity and of excellent thermal and hydrolytic stability.

While the invention has been illustrated with just the various intermediate 2,2-dimethylalkyl β-methoxypropionates and β-methoxyisobutyrates, it will be understood that other generally similar starting esters can also be used in the process of the invention, for example, intermediates such as the 2,2-dimethylalkyl esters of β-ethoxypropionic acid, of β-ethoxyisobutyric acid, of β-propoxypropionic acid, etc. In other words, similar esters of β-alkoxypropionic and β-alkoxyisobutyric acids wherein the alkoxy group contains from 1 to 4 carbon atoms.

The acrylate products according to this novel process are superior to prior art processes as there is substantially no acrylic or methacrylic acid in the final monomer product. Thus, the acrylate can be easily separated from the starting materials and the residual alcohol and can subsequently be reacted to form a highly crystalline polymer. If any acrylic acid is present it would readily polymerize to yield a glass-like solid which is very water susceptible. Even when small amounts of the acrylic acid are present in the acrylate polymerization, the resultant polymer product will be a mixture of polymers with greatly decreased crystalline properties. Thus, as one can readily see, this process will offer economical, commercial advantages by producing an acrylate without the necessity of costly acrylic acid removal from the monomer product.

The invention has been described in detail with particular reference to preferred embodiments thereof, but it will be understood that variations and modifications can be effected within the spirit and scope of the invention as described hereinafter and as defined in the appended claims.

What we claim is:

1. An essentially non-catalytic process for preparing an ester of the general formula:

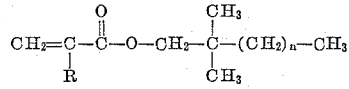

which comprises thermally cracking at from 450 to 550° C. a compound having the general formula:

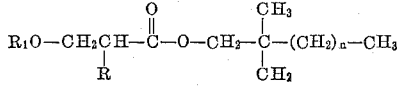

wherein in each instance $n$ represents an integer of from 0 to 3, R represents a member selected from the group consisting of hydrogen and a methyl group, and $R_1$ represents an alkyl group of from 1 to 4 carbon atoms.

2. An essentially non-catalytic process for preparing 2,2-dimethylpropyl acrylate which comprises thermally cracking 2,2-dimethylpropyl β-methoxyproprionate at from 450 to 550° C.

3. An essentially non-catalytic process for preparing 2,2-dimethylbutyl acrylate which comprises thermally cracking 2,2-dimethylbutyl β-methoxypropionate at from 450 to 550° C.

4. An essentially non-catalytic process for preparing 2,2-dimethylhexyl acrylate which comprises thermally cracking 2,2-dimethylhexyl β-methoxypropionate at from 450 to 550° C.

5. An essentially non-catalytic process for preparing 2,2-dimethylpropyl methacrylate which comprises thermally cracking 2,2-dimethylpropyl β-methoxyisobutyrate at from 450 to 550° C.

6. An esentially non-catalytic process for preparing 2,2-dimethylbutyl methacrylate which comprises thermally cracking 2,2-dimethylbutyl β-methoxyisobutyrate at from 450 to 550° C.

References Cited by the Examiner

UNITED STATES PATENTS

| | | | |
|---|---|---|---|
| 2,393,737 | 1/1946 | Bortnick | 260—486 |
| 2,457,225 | 12/1948 | Gresham | 260—486 |
| 3,006,960 | 10/1961 | Luten et al. | 260—530 |
| 3,022,339 | 2/1962 | Enk et al. | 260—486 |
| 3,031,493 | 4/1962 | Enk et al. | 260—486 |
| 3,210,404 | 10/1965 | Durr et al | 260—485 |

OTHER REFERENCES

Wagner: "Synthetic Organic Chemistry," pages 232–233 and 480–481 (1953).

LORRAINE A. WEINBERGER, *Primary Examiner.*

A. P. HALLUIN, *Assistant Examiner.*